United States Patent [19]
Keen et al.

[11] Patent Number: 5,774,882
[45] Date of Patent: Jun. 30, 1998

[54] CREDIT APPROVAL SYSTEM

[76] Inventors: Regina D. Keen, 402 Wilson St., Laurel, Del. 19956; Helen J. Panzullo, E. 530 Scarp Dr., Millsboro, Del. 19966

[21] Appl. No.: 140,489

[22] Filed: Oct. 25, 1993

Related U.S. Application Data

[63] Continuation-in-part of Ser. No. 850,028, Mar. 12, 1992, abandoned.

[51] Int. Cl.[6] .................................................. G06F 17/60
[52] U.S. Cl. .............................................. 705/38; 705/35
[58] Field of Search .................................. 364/401, 406, 364/408, 405; 382/41, 61, 101, 175, 176, 187; 235/375, 380; 705/35, 38

[56] References Cited

U.S. PATENT DOCUMENTS

| | | | |
|---|---|---|---|
| 4,491,725 | 1/1985 | Pritchard ................................. | 235/375 |
| 4,734,859 | 3/1988 | Hamaguchi ............................. | 364/408 |
| 4,736,294 | 4/1988 | Gill et al. ................................ | 364/408 |
| 4,774,664 | 9/1988 | Campbell et al. ...................... | 364/408 |
| 4,812,628 | 3/1989 | Boston et al. .......................... | 235/380 |
| 5,023,782 | 6/1991 | Lutz et al. .............................. | 364/405 |
| 5,025,138 | 6/1991 | Cuerva ................................... | 235/379 |
| 5,054,096 | 10/1991 | Beizer ..................................... | 382/41 |
| 5,058,185 | 10/1991 | Morris et al. ........................... | 382/41 |
| 5,134,669 | 7/1992 | Keogh et al. ........................... | 382/61 |
| 5,218,539 | 6/1993 | Elphick et al. ....................... | 364/419.1 |
| 5,239,462 | 8/1993 | Jones et al. ............................ | 364/408 |
| 5,291,002 | 3/1994 | Agnew et al. .......................... | 235/375 |

OTHER PUBLICATIONS

American Management Systems, Inc. ACAPS version 5.0 System Definition Manual, pp. 3–35 to 3–38 and 5–7 to 5–11, Sep. 30, 1992.

Punch, Linda, "A Banner Year for the Crooks", Credit Card Management p. 98, Mar. 1992.

Tulip, Sam, "Fighting the Fraudsters", Credit Management, pp. 26–28, Apr. 1992.

*Primary Examiner*—Gail O. Hayes
*Assistant Examiner*—Barton L. Bainbridge
*Attorney, Agent, or Firm*—Richard C. Litman

[57] ABSTRACT

An automated security credit checking system for checking a credit application for fraud before a credit card is issued. The credit checking system scans the credit application, and uses an optical character recognition program to check the application. The credit checking system helps determine whether the application is legible, and whether there is a discrepancy between the post mark and the mailing address. The credit checking system automatically determines whether the application is a corporate or individual application, and whether the application is one of numerous requests from the same person, employer, or address. The credit checking system also tracks the status of each application and the route each type of application has taken, whether it is a corporate application, a suspected fraudulent application, a verified fraudulent application, or a rejected application. This credit checking system checks on-line national fraud information sources, and fraud information that is compiled by the system and entered into system memory on a daily basis. A letter listing credit bureaus to contact for protection is generated and sent to any victim of fraud detected during daily credit checking. The automated credit checking system keeps a daily tally of the number of corporate applications received, the percentage of individual applications approved, the percentage of individual applications declined or rejected, and the percentage of individual applications that were detected as being fraudulent.

15 Claims, 2 Drawing Sheets

CREDIT APPROVAL SYSTEM

CROSS-REFERENCE TO RELATED APPLICATION

This application is a continuation-in-part of U.S. patent application Ser. No. 07/850,028 filed on Mar. 12, 1992, now abandoned.

BACKGROUND OF THE INVENTION

1. Field of the Invention

The present invention relates to an automated security credit checking system to review credit Document applications to detect and prevent fraud before credit is issued.

2. Description of the Prior Art

In the prior art security credit checking systems, the security and credit checking is done manually, which leads to attendant human error, such as lost files and miscalculations. There is also no provision for having other information from the credit bureaus' or verified fraud information on-line in the system from any source (e.g., security investigations) report on-line in the system. A company conducting a credit check has to contact a suspected victim of fraud to verify or prove the fraud. Once verified, the company sends the verified fraud information to the bureau to be noted. This causes delays, and the possibility of the information being lost in the mail or more fraud activity being perpetrated before the credit bureau can be notified.

U.S. Pat. No. 5,025,138 issued to Cuervo shows a method and system for providing verification of credit information. This system provides for automatically updating variable information of a debtor of a participating member.

U.S. Pat. No. 4,774,664 issued to Campbell et al. shows a data processing system which brings together various data into a processing and accounting system. It also describes the method of operating the central processor.

U.S. Pat. No. 4,491,725 issued to Pritchard shows a verification and processing system to determine a member's background history.

U.S. Pat. No. 5,054,096 issued to Beizer describes a general system for electronically processing a large volume of documents utilizing high speed area networks to distribute images and data related to the documents. While Beizer discloses many components which may also be used by one of ordinary skill in the art to implement the present invention, Beizer has no method or teaching for detecting and preventing credit fraud at an early stage of the application process.

In the conventional credit approval systems and methods as discussed in the above patents, none of the systems or methods provide for having on-line information from all of the major credit bureaus as well as separate known credit fraud information compiled and updated by a national fraud information source. In addition, none provide for the separate input and updating of information regarding prior fraudulent applications into the system memory to check against current applications to detect fraudulent credit applications.

None of the above patent references, taken either alone or in combination, is seen to describe the instant invention as claimed.

SUMMARY OF THE INVENTION

The present invention is intended to overcome the problems of the prior art security credit checking systems by scanning the original credit application and storing the scanned application in the system memory and using the computer to do all of the processing of the credit application other than calling the applicant to verify illegible or incorrect information on the credit application.

Accordingly, it is a principal object of the invention to detect fraud and sort the credit applications into four categories before a credit card is issued or during the credit approval process and to mail out letters to the applicants according to the category that the application falls into.

It is another object of the invention to have a flow screen to locate the application during the credit approval process and to indicate the route that the application has taken, as well as to scan and send the application to record retention for access by governmental agencies.

It is a further object of the invention to check the credit application for legibility, application type, discrepancies between the post mark and the mailing address, and requests from the same person, employer, et cetera, for numerous applications and to automatically check with nationwide credit bureaus for credit information on the applicant and to make a list of fraudulent information on-line to check new applications against to prevent new applications from slipping through the process and to generate a letter to send to the victim of fraud.

Still another object of the invention is to have the Credit Department (System Memory) show on-line the area code of the applicant's telephone number, the zip code of the applicant's home address and the applicant's Social Security Number.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 4:
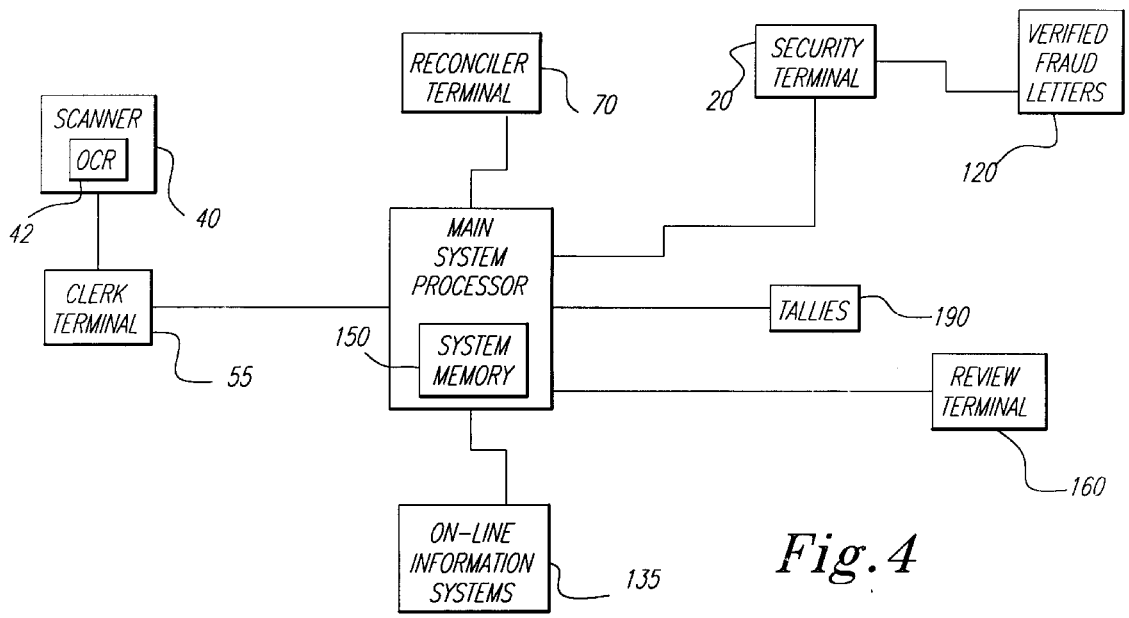
FIG. 4 is a block diagram of a preferred embodiment of the invention according to FIGS. 1.

The present invention is an automated security credit checking system and a method of using the same. The automated security credit checking system of the present invention comprises a main system processor 10, scanner 40 and a computer station or automated clerk 55. The system interacts with a mail room, a record retention area 30 for archiving the original credit application, and a security department 20. As shown in FIG. 4, system processor 10 preferably comprises a computer network where the various departments and offices may be electronically interconnected. A local area network (LAN) is a well known example.

Figure 1:
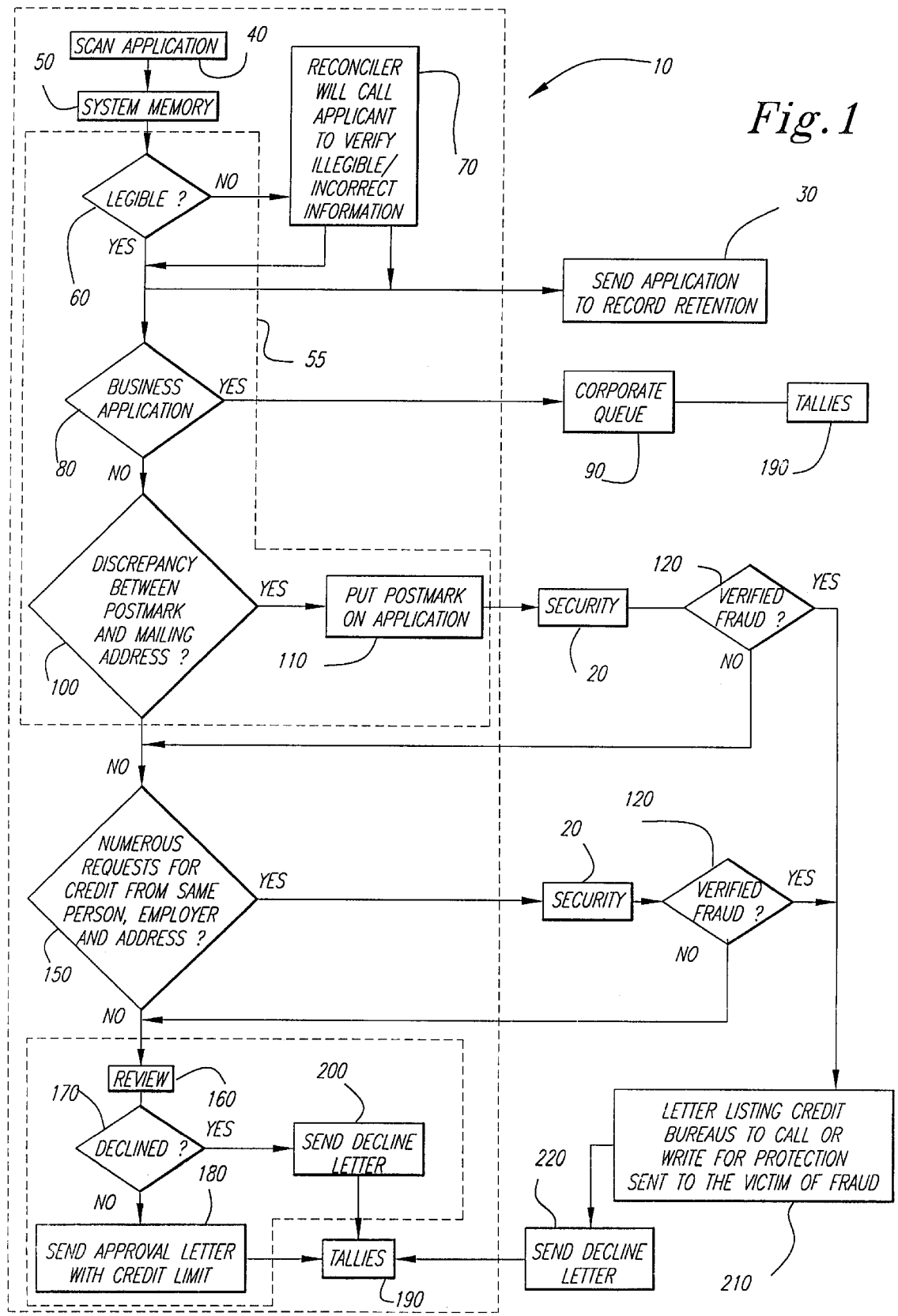
FIG. 1 is a flow chart of the Automated Security Credit Checking System of the present invention.
Figure 2:
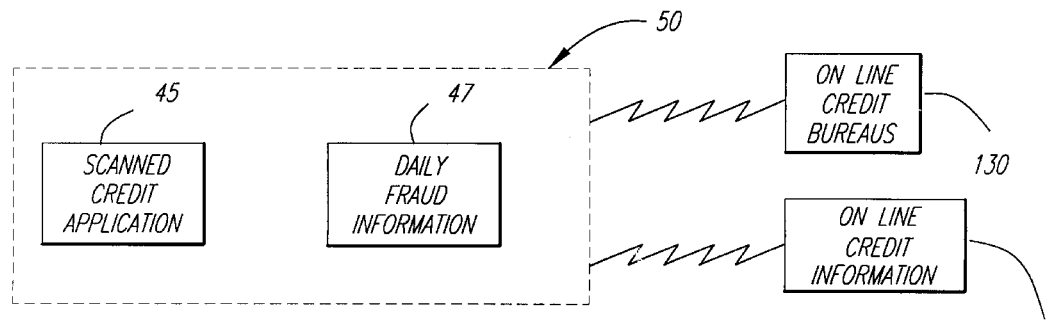
FIG. 2 is an expanded block diagram of the System Memory block of FIG. 1.
Figure 3:
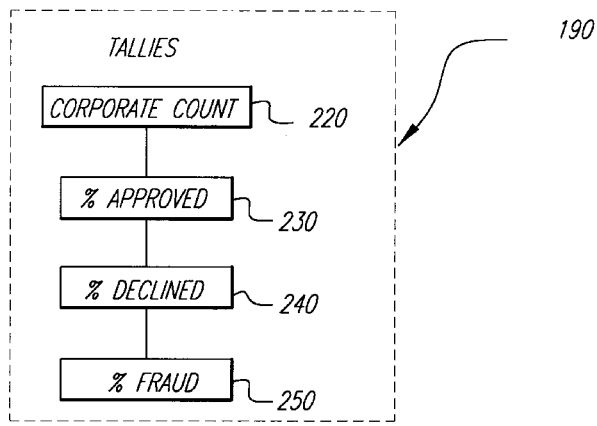
FIG. 3 is an expanded block diagram of the Tallies block of FIG. 1.

As illustrated in the flow chart in FIG. 1, when an original credit application enters the mail room, the application and its accompanying postmarked envelope is scanned by a scanner 40. Scanner 40 is preferably a high resolution flat bed scanner, and would include an optical character recognition or OCR unit 42, either in the form of software programming or hardware, to convert the scanned credit application 45 into readable character-based alphanumeric data or legible text. OCR unit eliminates the processing of information by keyboard input, thereby avoiding human error while making improved use of the computer's high processing speed. OCR unit 42 reads and recognizes typed and hand-written characters by correlating the scanned image data to the sets of legible characters stored in a font dictionary. The converted text is then displayed on the screen of the automated clerk. Any illegible text is flagged for correction. A mail room clerk can then compare the flagged text with the original application to correct any illegible text. In another preferred embodiment of the invention, the automated clerk 55 takes the OCR-produced document and reads the application data based on predefined areas of interest (AOI). Preferably, the credit application is a standardized form. The automated clerk 55 then sorts the information based on the AOIs and displays formatted and labeled information on the terminal screen. A mail room clerk can then compare the information produced on the screen with that contained in the original application, and flag any discrepancies.

If the application itself is not legible, the flagged text and information is sent to an inputter or reconciler terminal 70. The inputter or reconciler, preferably the mail room clerk or a telemarketing representative, calls the applicant to verify the illegible or incorrect information. After the reconciler corrects any incorrect or illegible information, the application information is sent back to the automated clerk 55, where the scanned credit application 45 is checked to determine whether the application is a corporate or an individual application 80. The automated clerk 55 takes the OCR-produced document and reads the application data based on the predefined areas of interest (AOI) on a standardized application form. Thus, after the application information is returned from the reconciler, the system reads the data in the "Application Type" AOI to determine whether the application is from a corporation or an individual. In another preferred embodiment of the invention, a bar code is contained on the application to identify it to the scanner and the system as either a corporate application form, or an individual application form.

If the credit application is a corporate application, the application information is sent to the corporate queue 90 for processing. The fact that the application 45 is a corporate application is sent to tallies 190 to be tabulated and recorded. Preferably a database program can tabulate and store this data on the system memory for future applications and audits. Preferably, the final decision whether to grant a corporate application would be the Corporate Manager's responsibility. Therefore it is not processed in the same manner as individual applications. However, the application information is stored in the system, and a credit report from a nationwide credit bureau 130 may be accessed and matched with the application information. Each credit report is kept on line and active until a final decision is made. This serves to speed the decision making process for corporate applications by correlating important credit history information and making that information easily available to those terminals connected to the system.

If the application is from an individual, discrepancies between the post mark and the mailing address 100 are checked by the main system processor 10. The application's post marked envelope is scanned by scanner 40 and OCR unit 42. The envelope contains only one AOI region of interest. That area is the postmark area in the upper right corner of the envelope. The scanned and OCR-converted postmark is compared to the mailing address. A discrepancy would be found if the postmark was from California, but the applicant's mailing address was listed as being New York. If there is such a discrepancy between the post mark and the mailing address, the system processor 10 will prompt the mail room to write the postmark's origin or otherwise put the postmark on the application 110. The main processor preferably sends the digitally scanned images of both the scanned application and the post mark to security terminal 20 to verify the existence of any attempt at fraud in the application. Verified fraud 120 would be established after locating and talking with the suspected victim.

The mailroom may also attach the postmarked envelope to the application itself when sending the original application to security 20. Preferably, security 20 compares the information on the application 45 against the information from on-line information systems 135, preferably on-line credit bureaus 130 and the on-line fraud information (or national fraud information source) 140, loaded in system memory 50. Also, information 47 is input directly into the system memory 50 on a daily basis to prevent new sham applications from slipping through the system undetected. For example, verified fraud, or the information contained in applications verified as being fraudulent, is inputted into system memory 50 on a daily basis to catch any incoming fraudulent information and duplicate applications that come to the company. In this way, multiple contemporaneous applications with common facts or applicants can be more easily detected. For example, if a duplicative application from the same applicant is received within a certain amount of time, that application is automatically declined and a form letter to that effect is then generated.

At any time during the processing by the main system processor 10, a terminal such as the automated clerk 55 can also access the area code of the applicant's telephone number, the state and city associated with that area code, the zip code of the applicant's home address, and the applicant's social security number. This information is read from the appropriate AOI into the system memory for free global access by a terminal.

If there is no discrepancy between the post mark and the mailing address, or if security 20 is unable to verify any fraud, the application information is sent back to the main system processor 10. The application information is checked by the main system processor to determine if it is one of numerous or duplicative requests for credit from the same person, employer, or address 150. The application information may also be checked against other categories of information. If the credit application is one of numerous requests for credit from the same person, employer, or address, it is also sent to security 20 where it is checked for verified fraud 120. If the credit application 45 is not one of numerous or duplicative requests for credit from the same person, employer, or address, or if security 20 determines that the application contains no verified fraud, then the application is passed on for review 160, where the main system processor 10 determines whether the application is to be approved or declined 170.

The main system processor 10 may access the on-line credit bureaus and the on-line fraud information though its system memory 50 to check against the application information. The application is determined to be approved or denied by checking and reviewing the application information to determine, among other determinants, whether (a) the applicant earns enough money for different levels of credit, (b) the applicant has been employed at applicant's current employer long enough to obtain credit, (c) the applicant has lived at applicant's current home address long enough to obtain credit, (d) the applicant has paid his past bills in a timely manner, and (e) the applicant is the only person who inhabits applicant's current address. Preferably, the system will automatically generate a decline letter only for bad credit histories, low or insufficient income, or an application for a minor without a guarantor. This information may be obtained either from the appropriate AOIs on the scanned application, the on-line information systems, and the "fraudulent" information is inputted into the system daily. A suitable financial software program then checks and reviews the application information in the system processor according to the above criteria.

If the application 45 is approved, an approval letter stating the approved credit limit 180 is generated. This letter is sent to the applicant and the fact that the application was approved is sent to tallies 190. If the application is declined or rejected, the applicant is sent a rejection letter 200, and the fact that the application 45 is declined is sent to tallies 190. These letters are preferably form letters requiring no further human involvement.

If the application is determined to contain verified fraud 120, then several different form letters are preferably generated. First, a letter listing the credit bureaus to call or write to for protection 210 is sent to the verified victim of the fraud. The fact that the application 45 contains fraud is sent to tallies 190. In addition, the application information is tagged to alert anyone on the system of the application's status as fraudulent. The "fraudulent" information is also inputted and stored in the system memory for future verification checking.

After the application information is checked and verified, the original credit application is sent to record retention 30 for storage. Record retention 30 preferably is a central file room. Government agencies may access applications through record retention 30. The scanned image may also be digitally stored, either on a magnetic or optical medium, for future access and to create a more "paperless" office. Preferably, the scanned image is digitally compressed by any known data compression technique. The original application may also be scanned, preferably on digital data storage device, microfiche or any other suitable medium, to provide a backup hard copy as a safety measure.

At any time during or after the above processing by the main system processor 10, a terminal such as the automated clerk 55 can access which section of the main system processor is currently working on the application information. The terminal screen will give access for all information associated with the application in the system memory. The information may be retrieved by entering the Application number, name, address, social security number, telephone number, business telephone number, or any suitable information field. Also, based on the type of application being processed, whether corporate or individual, the terminal may also lay out a flow screen showing the stages of the credit processing and the status of the application. The flow screen will be able to locate the application, determine and display its progress within the system, and identify whoever has accessed the application information at any given time.

At the end of the work day, tallies 190 contain the corporate count 220, the percentage of individual credit applications that were approved 230, the percentage of individual credit applications that were declined 240, and the percentage of individual credit applications that contained fraud 250. This compiled information is then stored for future use or auditing, and the tallies 190 are then cleared for the next day.

Credit checking system 10 further includes a "hot spots" screen for indicating the regions of the country with high incidents of fraud. Hot spot information relating where a large number of fraudulent applications originated can be stored and compiled for later access. Hot spot information is beneficial for avoiding credit fraud in the future by giving a user instant recognition and notice of geographic areas to be avoided in future marketing efforts. Hot spots screen may be displayed on any terminal screen, preferably review terminal 160.

It is to be understood that the present invention is not limited to the sole embodiment described above, but encompasses any and all embodiments within the scope of the following claims.

We claim:

1. An automated security credit checking system comprising:

main computer system processor means;

computer terminal means electronically connected to said main computer processor means for receiving and scanning original credit applications and envelope postmarks from envelopes of the original credit applications wherein a scanned credit application and envelope postmark is formed when a credit application and envelope postmark is scanned;

system memory means for storing said scanned credit application and envelope postmark that is sent to said system memory means from said computer terminal means;

inputter terminal means electronically connected to said main computer system processor for allowing review of said scanned credit application and envelope postmark for legibility, wherein said scanned credit application and envelope postmark is sent to said inputter terminal means from said system memory means;

verification terminal means electronically connected to said main computer system processor means for determining whether said scanned credit application contains suspected fraud by comparing a mailing address of the application to a location from the envelope postmark and suspecting fraud if the mailing address and postmark location are different;

verified fraudulent application terminal means electronically connected to said main computer system processor means for processing said scanned credit application after determining that said scanned credit application contains verified fraud;

review terminal means electronically connected to said main computer system processor means for receiving said scanned credit application after processing by said verification terminal means when said verification terminal means determines than no fraud exists in said scanned application; and tallies means electronically connected to said main computer system processor means for calculating totals and percentages of applications received and approved on a daily basis.

2. The automated security credit checking system according to claim 1, wherein:

said main computer system processor means further comprises communication means for accessing and checking information on said scanned credit application against information supplied by a plurality of credit database means;

sorting means for determining the type of credit application said scanned credit application is, whereby the types of credit applications comprises a corporate type and an individual type.

3. The automated security credit checking system according to claim 2, wherein said tallies means calculates a total number of corporate type applications received on any one day, a percentage of a total number of individual type applications received on any one day that are fraudulent, a percentage of said total number of individual type applications received on any one day that are approved, and a percentage of said total number of individual type applications taken in on any one day that are declined.

4. The automated security credit checking system according to claim 3, wherein said main computer processor means further comprises means for compiling and displaying geographic regions where a substantial number of fraudulent applications have originated.

5. The automated security credit checking system according to claim 1, wherein said computer terminal means comprises a character recognition means for determining the legibility of said scanned application.

6. The automated security credit checking system according to claim 1, wherein said verified fraudulent application terminal means generates a letter for mailing to a victim of verified fraud, whereby said letter states which credit bureaus said victim can contact for protection against said fraud.

7. The automated security credit checking system according to claim 1, wherein said review means checks information on said scanned credit application to determine the eligibility of said applicant for credit by comparing said scanned application with credit criteria including whether an applicant earns sufficient money to obtain different levels of credit, if said applicant has been employed at said applicant's current employer long enough, if said applicant has lived at said applicant's current home address long enough, if said applicant has paid said applicant's past bills in a timely manner, and if said applicant's current address is only inhabited by said applicant.

8. A method of reviewing credit card applications prior to issuance of credit comprising the steps of:

scanning each credit application received to form a digital record of the credit application;

storing each scanned application filed by an applicant in a system memory means;

checking the stored scanned application for legibility;

prompting an inputter to call an applicant listed on the digital record to verify and correct illegible and incorrect information;

checking the stored scanned application to determine whether it is a corporate application;

sending the stored scanned application to a corporate queue if the scanned application is determined to be a corporate application;

sending the fact that the scanned application is a corporate application to a tallies means;

scanning an envelope in which the credit application is contained to form a digital record of the envelope;

checking the scanned application to see if there is a discrepancy between a scanned postmark on the envelope and a mailing address on the scanned application;

sending the scanned application and the scanned postmark to a security means to be checked for verified fraud if the discrepancy is found;

checking to see if the digital record is one of numerous applications listing the same applicant, applicant's employer or applicant's address if there is no discrepancy between the post mark and the mailing address on the scanned application;

sending the stored scanned application to the security means if the scanned application is one of the numerous applications listing the same applicant, applicant's employer or applicant's address;

sending the stored scanned application to a review means if the film record contains no verified fraud, checking the stored scanned application to determine if the applicant is eligible for various levels of credit;

sending a letter listing various credit bureaus to contact for protection to a victim of the verified fraud when verified fraud is established and then sending the fact that the digital record contains verified fraud to the tallies means;

sending a decline letter to the applicant if the credit application is declined and there is no verified fraud and sending the fact that the credit application is declined to the tallies area; and sending an approval letter to the applicant if the credit application is approved and sending the fact that the credit application is approved to the tallies area.

9. The method of reviewing credit card applications of claim 8, further comprising the steps of:

calculating a number of credit applications sent to the corporate queue each day;

storing the number of the stored scanned applications sent to the corporate queue in the tallies means;

calculating a percentage of the scanned applications that are approved based on a total number of scanned applications processed;

storing the percentage of credit applications that are approved in the tallies area;

calculating a percentage of scanned applications that are declined based on the total number of individual applications processed;

storing the percentage of the credit applications that are declined in the tallies area;

calculating a percentage of scanned applications that contain verified fraud compared to the total number of scanned applications processed; and storing the percentage of scanned applications that contain verified fraud in the tallies area.

10. The method of reviewing credit card applications of claim 8, further comprising the steps of:

checking information on the stored scanned applications against information contained in various credit databases and contained in the system memory when the digital record is in the security means to verify if there is fraud present on the scanned application.

11. A method of reviewing credit applications, the improvements comprising:

scanning an envelope containing a credit application, and digitally storing the scanned envelope in a memory means;

scanning the credit application, and digitally storing the scanned application in the memory means;

checking for discrepancies between a mailing address contained in the stored application and a postmark contained on the stored envelope;

sending the stored application and the stored postmark to a security means to verify the existence of fraud in the stored application if the discrepancies are found;

sending the stored application to a verification means for comparing the stored application to information contained in a database means for determining whether the stored application is related to multiple requests from the same person;

sending the stored application to the security means to verify the existence of fraud in the stored application if the determination is found to be affirmative;

sending the stored application to a review means to conclude whether to approve or deny the stored application if the determination is found to be negative.

12. The method of reviewing credit applications according to claim 11, further comprising the steps of:

sending the stored application to a verification means for comparing the stored application to information contained in a database means for determining whether the stored application is related to multiple requests from the same employer.

13. The method of reviewing credit applications according to claim 11, further comprising the steps of:

sending the stored application to a verification means for comparing the stored application to information contained in a database means for determining whether the stored application is related to multiple requests from the same address.

14. The method of reviewing credit applications according to claim 11, further comprising the steps of:

generating automatically a letter for mailing to a victim of verified fraud when verified fraud is found to exist, whereby the letter lists which credit bureaus the victim may contact for protection against the fraud.

15. The method of reviewing credit applications according to claim 11, further comprising the steps of:

generating automatically a letter for mailing to a victim of verified fraud when verified fraud is found to exist, whereby the letter lists which credit bureaus the victim can contact for protection against the fraud.

* * * * *